Jan. 23, 1940.  F. B. RENTZ  2,187,810
GLARE SHIELD EYEGLASS
Filed Aug. 13, 1938   2 Sheets-Sheet 2
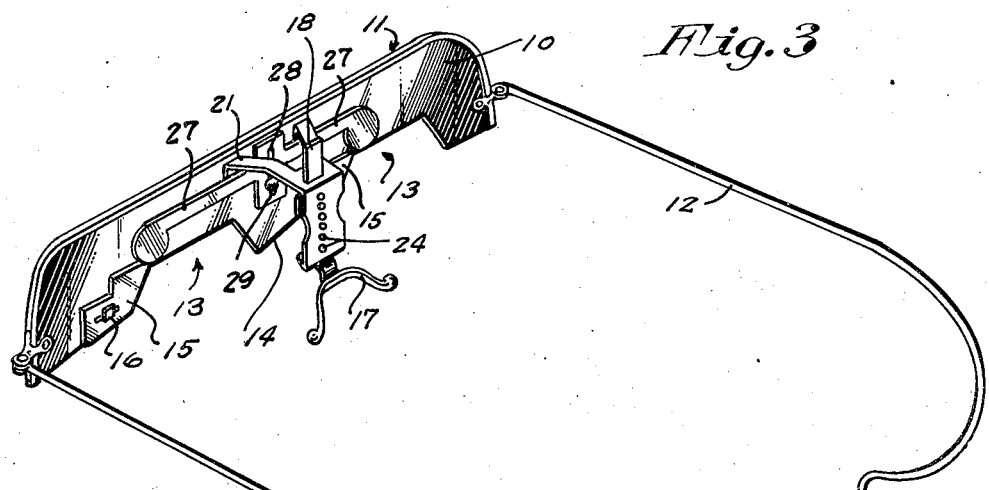
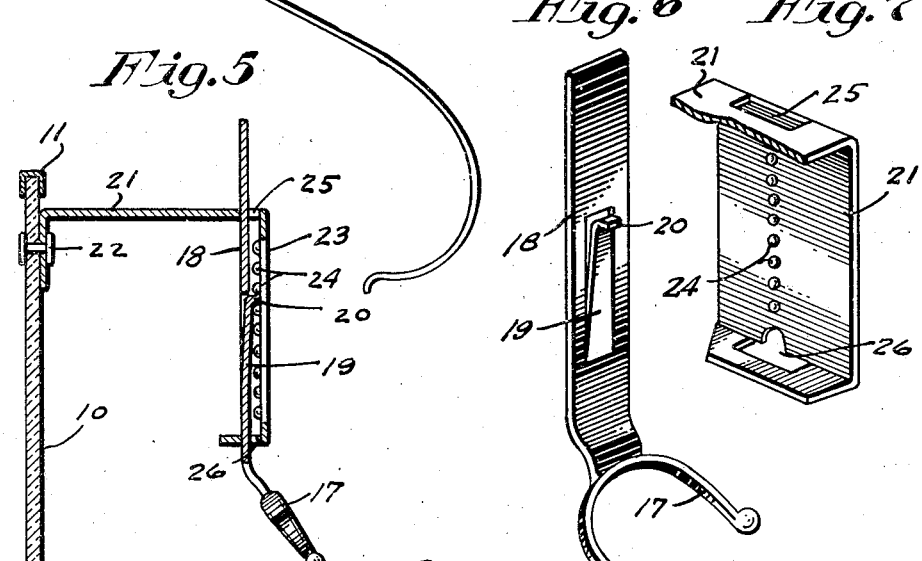
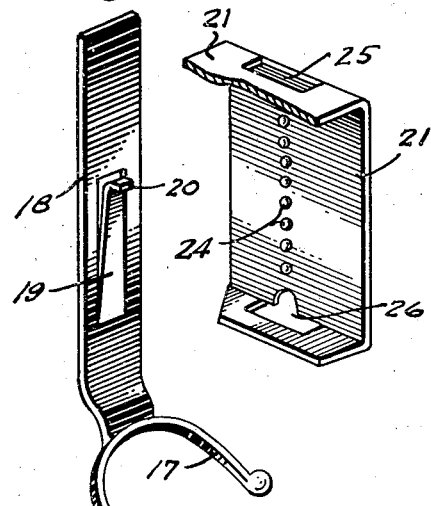
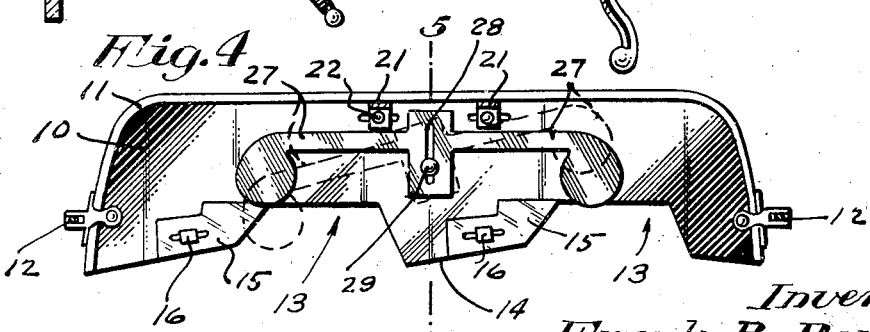
Inventor
Frank B. Rentz
By his Attorneys Patented Jan. 23, 1940

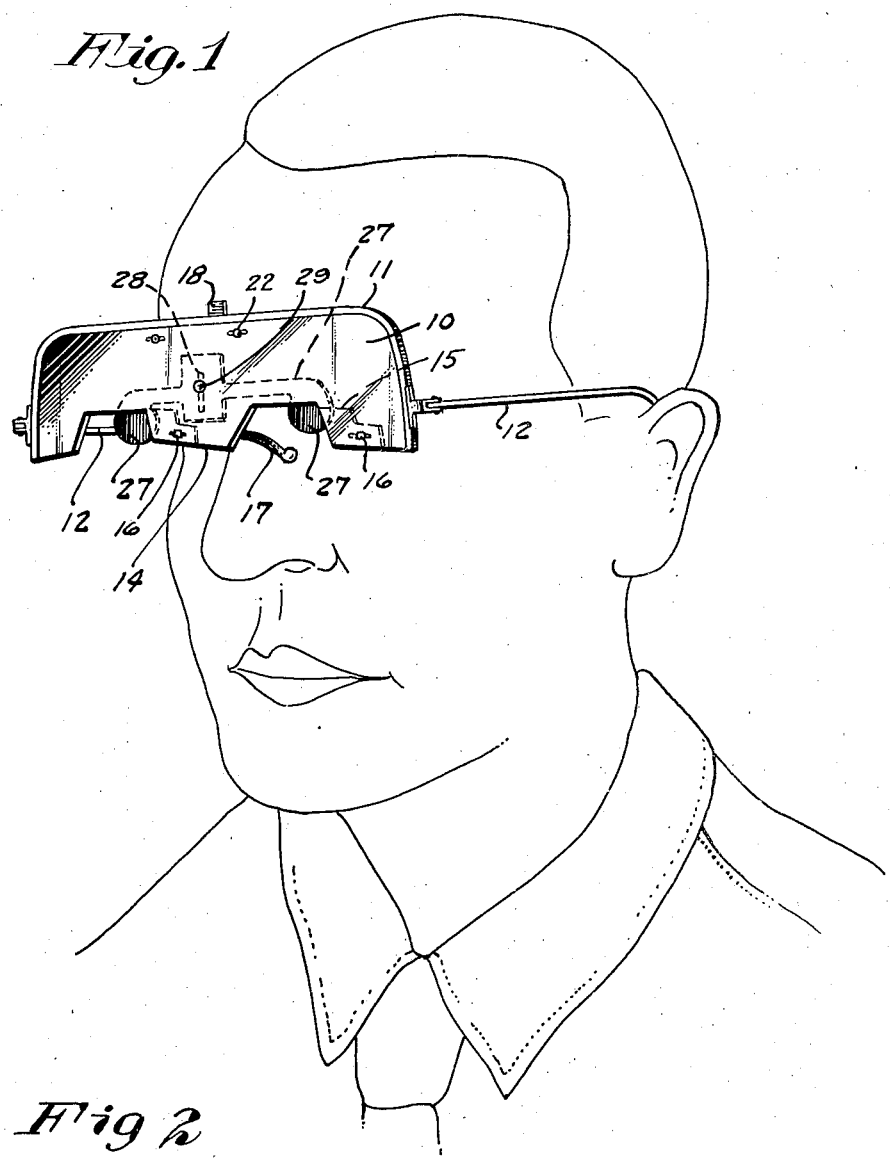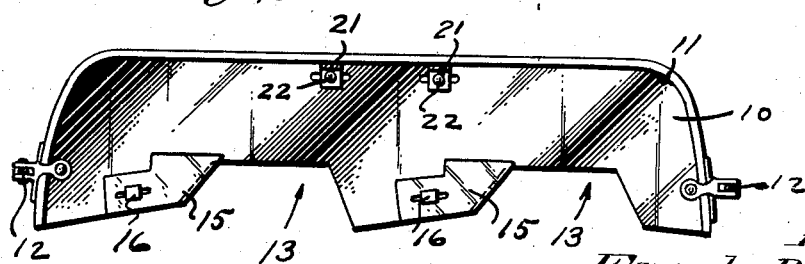

2,187,810

UNITED STATES PATENT OFFICE 2,187,810

GLARE SHIELD EYEGLASS

Frank B. Rentz, Wells, Minn., assignor to Henry Barnick, Wells, Minn.

Application August 13, 1938, Serial No. 224,781

2 Claims. (Cl. 88—41)

My invention provides an improved and highly efficient glare shield eyeglass which is capable of meeting all of the conditions encountered in driving of automobiles and the like.

In its preferred embodiment, the invention involves a primary glare shield or screen that will prevent blinding rays from the headlights of approaching automobiles, and also a secondary or minor glare shield or screen that will cut out or intercept the actinic rays of the sunlight. The primary or major screen is preferably of dark transparent or translucent material having a smoked appearance; while the secondary screen is preferably tinted buff or yellow. These primary and secondary screens may be of glass, Celluloid or similar naturally transparent materials.

The primary screen is notched at its under edge to afford clear vision light passages and as an additional feature these clear vision light passages are made adjustable as to width. The secondary screen may be readily moved to and from operative positions with portions thereof presented in the clear vision light passages of the primary shield or screen.

The nose rest of the device is offset from the primary screen and is made adjustable by very simple and novel means. The complete device is adapted to be worn after the manner of ordinary spectacles.

The commercial form of the device is illustrated in the accompanying drawings wherein like characters indicate like parts throughout the several views.

Referring to the drawings:

Fig. 1 is a perspective showing the complete glare shield applied to the head of a wearer;

Fig. 2 is a rear elevation of the primary shield or screen and its frame, some parts being sectioned and some parts being removed;

Fig. 3 is a perspective showing the complete glare shield looking at the same from the rear;

Fig. 4 is a view corresponding to Fig. 2 but showing the secondary shield or screen applied;

Fig. 5 is a vertical section on a large scale taken on the line 5—5 of Fig. 4;

Fig. 6 is a perspective showing the nose rest removed from its supporting bracket; and Fig. 7 is a perspective showing the nose piece supporting bracket, some parts being broken away.

The primary glare shield 10 is a flat plate of the character above indicated held in a yoke-like marginal frame 11 to the sides of which the ear bows 12 are pivotally attached after the manner of an ordinary pair of spectacles. In its under edge the shield or screen 10 is formed with large notches 13 that afford clear vision light passages. Between the light passages 13 the screen 10 has a depending portion 14, the under surface of which is obliquely cut, for a purpose that will presently appear. To vary the spacing between the light passages 13 and also the width of the light passages, the screen 10 is provided with laterally adjustable sections 15 that are preferably of the same material as said primary screen. These supplemental sections 15 are shown as made adjustable by slot screw or bolt sections 16. The side edges of the passages 13 are obliquely cut preferably at an angle of about 60° to a vertical.

The nose rest employed is preferably in the form of a fork 17 secured to the lower end of a flat metal upwardly extended stem 18, from which is partially cut a spring lock prong 19 formed at its end with a lug or detent 20.

To support this nose rest offset a considerable distance from the screen 10, there is provided a light sheet metal bracket 21, the prongs of which are riveted or otherwise secured to the screen 10 at 22. The bracket 21, at a considerable distance rearward from the screen 10, has a depending portion 23 that is formed with vertically spaced lock lugs or projections 24. The horizontal portion of bracket 21 adjacent to depending plate 23 is formed with a slot 25. The lower end of said plate 23 is likewise provided with a slot 26. These slots 25 and 26 afford a guide passage for the flat stem 18 of the nose rest and mount the said nose rest for vertical adjustments. Under vertical adjustments of the nose piece the lug 20 of spring lock prong 19 will engage between the lugs 24 and lock the nose rest in various different adjustments against accidental movements; however by applying a reasonably considerable force, the nose piece may be moved vertically, under which action the lug 20 of prong 19 will spring over the lugs 24 into re-engagement at different vertical points.

With the arrangement just described, it is evident that the glare shield may be adjusted to the eyes so that proper vision will be afforded through the clear vision light passages 13 and through the screen 10. The rearward offsetting of the nose piece is important because it gives an angle of vision from the eyes of the wearer through the passages 13. The wearer of this device can, of course, by slight movement of the head, bring the device into position for vision at will either through the shield or screen 10 or through the clear vision light passages 13. As already indicated, the light passages 13 can be spaced and adjusted as to width to best suit the wearer.

The light from an approaching vehicle usually comes from the left of the driver and the beams will be projected under the oblique surface 14. In practice I have found that by shifting of the head and the shield laterally, the blinding light beams will be cut off more or less by this oblique edge 14.

The secondary shield or screen here employed is shown as attached to the back of the primary shield 10 for oscillatory and bodily vertical adjustments. As shown in the drawings, this secondary screen or shield 27 is in the form of a bar formed with enlarged outer free ends that normally overlie the light passages 13.

At its central portion, the shield 27 is provided with an enlarged portion formed with a vertical slot 28, through which and the shield 10 is passed rivet or small nut-equipped bolt 29. This secondary shield may be oscillated on pivot 29 so as to throw either one or the other of the enlarged ends into one or the other of light passages 13; or said secondary shield may be vertically adjusted bodily so as to throw both of its enlarged ends into the light passages 13. When the secondary shield is adjusted to operative positions, as stated, the wearer can look through the colored or tinted ends of said secondary shield. This secondary shield will be most useful when driving against the sun rays.

It will be noted that the rounded ends of the secondary shield 27 are smaller than the light passages 13. This is important because when one or both of the ends of said secondary shield are positioned in a light passage, only a part of the light rays passing through the said passages 13 will be intercepted by the secondary shield, but the secondary shield even then will be useful to protect the eyes from the blinding rays.

By references particularly to Fig. 2, it will be noted that the rivets or bolts 22 are passed through horizontal slots in the shield 10 so that the bracket 21 and hence the nose piece may be properly adjusted laterally in respect to the light passages regardless of the spacing and width of the light passages.

What I claim is:

1. A glare shield having means for attachment to the head of a wearer and formed in its lower edge with notches affording clear vision light passages, a bracket secured to said shield and having a rearwardly offset depending portion formed with vertically spaced locked lugs and aligned upper and lower stem passages, and a nose piece having a stem portion extended upward through the upper and lower passages of said bracket and having a spring prong formed with an end adapted for interlocking engagement with and between the lugs of said bracket to thereby afford a step by step lock device that may be readily overcome by internal force applied thereto.

2. A glare shield in the form of a plate having means for attachment to the head of a wearer and formed at its lower edge with notches affording unobstructed clear vision light passages, and supplemental vision intercepting shield sections adjustably and independently attached, for straight line sliding movements, to the lower part of said shield adjacent said notches on the corresponding sides of said notches and thereby made adjustable to vary the width of the said clear vision light passages afforded by said notches and also to vary the distance between said clear vision light passages, said supplemental shields and said notches having correspondingly bevelled downwardly flaring opposing edges.

FRANK B. RENTZ.